US012609561B2

(12) United States Patent
Ha et al.

(10) Patent No.: US 12,609,561 B2
(45) Date of Patent: Apr. 21, 2026

(54) TRANSMISSION UNIT OF WIRELESS OPTICAL CHARGING SYSTEM WITH ADJUSTABLE OUTPUT DIRECTION

(71) Applicant: INDUSTRY-ACADEMIA COOPERATION GROUP OF SEJONG UNIVERSITY, Seoul (KR)

(72) Inventors: Jin Yong Ha, Seoul (KR); Ngoc Luu Nguyen, Seoul (KR); Khanh Hung Nguyen, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 371 days.

(21) Appl. No.: 18/397,843

(22) Filed: Dec. 27, 2023

(65) Prior Publication Data

US 2025/0219472 A1      Jul. 3, 2025

(30) Foreign Application Priority Data

Dec. 27, 2023    (KR) ......................... 10-2023-0192501

(51) Int. Cl.
*H02J 50/90*        (2016.01)
*H02J 50/00*        (2016.01)
*H02J 50/30*        (2016.01)

(52) U.S. Cl.
CPC ............ *H02J 50/90* (2016.02); *H02J 50/005* (2020.01); *H02J 50/30* (2016.02)

(58) Field of Classification Search
CPC .......... H02J 50/90; H02J 50/005; H02J 50/30; G06T 7/70; H01S 3/0071; H01S 3/025; H01S 5/0071
USPC ...................................................... 250/491.1
See application file for complete search history.

(56) References Cited

U.S. PATENT DOCUMENTS

2017/0346347 A1* 11/2017 Abiri ....................... H02J 50/30

* cited by examiner

*Primary Examiner* — Michael Maskell
(74) *Attorney, Agent, or Firm* — Bridgeway IP Law Group, PLLC; Jihun Kim

(57) ABSTRACT

A transmission unit of a wireless optical charging system with an adjustable output direction attached to a ceiling of an indoor space according to the present disclosure includes: an optical generation unit that generates laser light; a vertical axis rotation unit that rotates along an axis perpendicular to a floor of the indoor space and transmits the laser light; a horizontal axis rotation unit that rotates while attached to the vertical axis rotation unit, is attached to a plurality of cameras, outputs the transmitted laser light, and rotates an output direction of the laser light and a direction of the plurality of cameras along an axis horizontal to the floor of the indoor space; and a control unit that controls the vertical axis rotation unit and the horizontal axis rotation unit according to rotation angles in vertical and horizontal directions calculated using images captured by the plurality of cameras.

8 Claims, 5 Drawing Sheets

100

100

123

122

134

132

124

126

Y

X

136 receiver

Scanning area

TRANSMISSION UNIT OF WIRELESS OPTICAL CHARGING SYSTEM WITH ADJUSTABLE OUTPUT DIRECTION

CROSS-REFERENCE TO RELATED APPLICATIONS

This application claims priority and benefit to Korean patent application No. 10-2023-0192501 filed on Dec. 27, 2023, the entire contents of which is incorporated by reference herein.

FIELD

The present disclosure relates to a transmission unit of a wireless optical charging system with an adjustable output direction.

DESCRIPTION OF THE RELATED ART

Currently known wireless charging technologies include a magnetic induction method, a magnetic resonance method, an RF electromagnetic wave method, a light utilizing method, and the like.

However, the magnetic induction and magnetic resonance methods have relatively high efficiency but have a limitation in that a transmittable distance of power is short. In addition, the RF electromagnetic wave method may dramatically increase the transmittable distance of power, but has low efficiency, so it is evaluated that the RF electromagnetic wave method will take a long time to be commercialized.

Therefore, there is increasing interest in a wireless optical charging system, which can further increase a transmittable distance of power compared to the magnetic induction method and the magnetic resonance method and can further increase the transmission efficiency of power compared to the RF electromagnetic wave method.

However, the wireless optical charging system has the difficulty of increasing charging efficiency only by accurately outputting light toward the reception unit that is the charging target.

Therefore, in order to improve user convenience in wireless optical charging systems, there is an emerging need for a transmission unit that automatically recognizes the reception unit and performs charging.

SUMMARY

Technical Problem to be Solved

An object to be achieved by the present disclosure is to provide a transmission unit of a wireless optical charging system capable of automatically recognizing a reception unit using a plurality of cameras and outputting light toward the reception unit through rotation around horizontal and vertical axes.

Technical Solution

A transmission unit of a wireless optical charging system with an adjustable output direction attached to a ceiling of an indoor space includes: an optical generation unit that generates laser light; a vertical axis rotation unit that rotates along an axis perpendicular to a floor of the indoor space and transmits the laser light; a horizontal axis rotation unit that rotates while attached to the vertical axis rotation unit, has a plurality of cameras attached thereto, outputs the transmitted laser light, and rotates an output direction of the laser light and a direction of the plurality of cameras along an axis horizontal to the floor of the indoor space; and a control unit that controls the vertical axis rotation unit and the horizontal axis rotation unit according to rotation angles in vertical and horizontal directions calculated using images captured by the plurality of cameras.

The plurality of cameras may include an IR camera and a depth camera.

The laser light generated from the optical generation unit may be reflected by a first mirror attached to the vertical axis rotation unit, may pass through a diffraction grating attached to the vertical axis rotation unit, and may then be reflected by a second mirror attached to the horizontal axis rotation unit and may output to an outside.

The laser light generated from the optical generation unit may pass through the diffraction grating attached to the vertical axis rotation unit, may be reflected by a first mirror attached to the vertical axis rotation unit, and may then again be reflected by a second mirror attached to the vertical axis rotation unit and may output to an outside.

The vertical axis rotation unit may rotate using a hollow shaft servo motor, and the laser light may be transmitted through a hollow of the hollow shaft servo motor.

The horizontal axis rotation unit may rotate the output direction of the laser light and the direction of the plurality of cameras within a predetermined range using a stepper motor.

The control unit may recognize a reception unit in a first image captured using the IR camera to generate a bounding box, acquire distance information, which is information on a distance to the reception unit, from a second image captured using the depth camera, calculate pixel distances in X-axis and Y-axis directions with respect to a center point of the first image and a center point of the bounding box in the first image, and calculate the rotation angles in the vertical and horizontal directions using the pixel distance, a focal length of the IR camera, and the distance information.

When the control unit calculates the rotation angles in the vertical and horizontal directions, the control unit may calculate a displacement of the reception unit using the pixel distance, the focal length of the IR camera, and the distance information, and calculate the rotation angles in the vertical and horizontal directions using the displacement and distance information, respectively.

Advantageous Effects

According to the transmission unit of the wireless optical charging system according to the present disclosure, it is possible to automatically recognize the reception unit using the plurality of cameras and outputting light toward the reception unit through the rotation around the horizontal and vertical axes.

3                                                                       4

Figure 3:
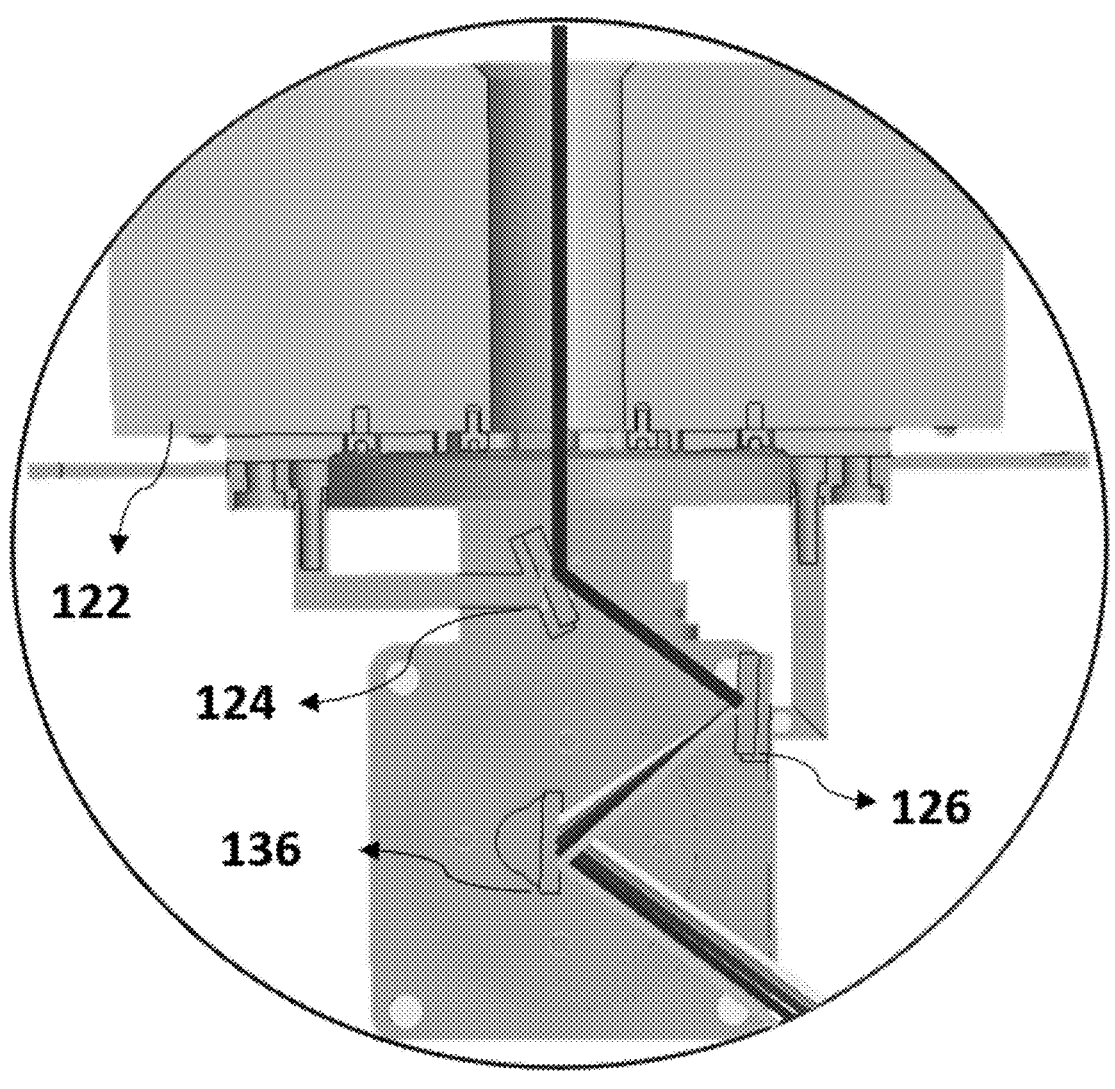
Figure 4:
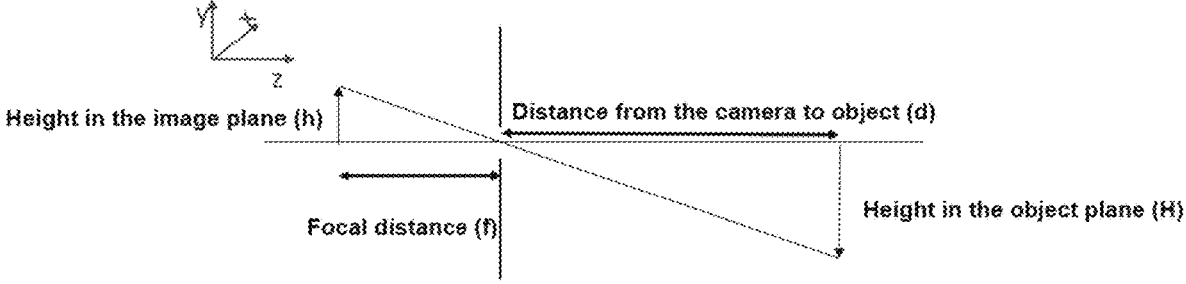
Figure 5:
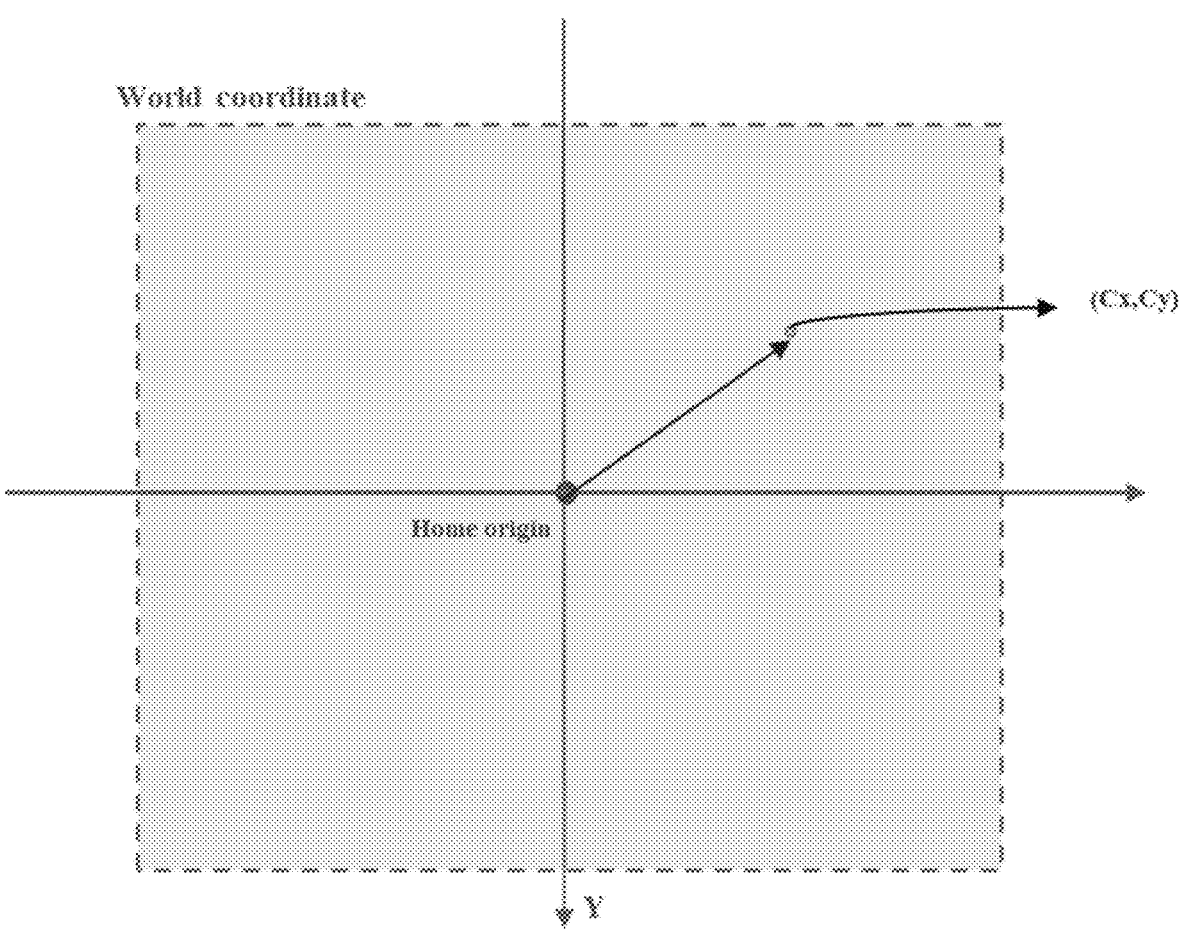

FIG. 3 is a diagram for describing a laser light transmission process of the wireless optical charging system with an adjustable output direction according to the exemplary embodiment of the present disclosure;

FIG. 4 is a diagram for describing a displacement calculation process of a reception unit according to an exemplary embodiment of the present disclosure; and FIG. 5 is a diagram for describing a process of calculating rotation angles in vertical and horizontal directions according to an exemplary embodiment of the present disclosure.

DETAILED DESCRIPTION OF THE EXEMPLARY EMBODIMENT

The present disclosure may be variously modified and have several exemplary embodiments. Therefore, specific exemplary embodiments of the present disclosure will be described in detail with reference to the accompanying drawings. However, it is to be understood that the present disclosure is not limited to a specific exemplary embodiment, but includes all modifications, equivalents, and substitutions without departing from the scope and spirit of the present disclosure. In describing each drawing, similar reference numerals are used for similar components.

Terms used in the specification, "first," "second," "A," "B" etc., may be used to describe various components, but the components are not to be interpreted to be limited to the terms. The terms are used only to distinguish one component from another component. For example, a first component may be named a second component and the second component may also be similarly named the first component, without departing from the scope of the present disclosure. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween.

Terms used in the present specification are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, numerals, steps, operations, components, parts mentioned in this specification, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those that are generally understood by those who skilled in the art. Terms generally used and defined by a dictionary should be interpreted as having the same meanings as meanings within a context of the related art and should not be interpreted as having ideal or excessively formal meanings unless being clearly defined otherwise in the present specification.

Through the present specification and claims, unless explicitly described otherwise, "comprising" any components will be understood to imply the inclusion of other components rather than the exclusion of any other components.

Hereinafter, the present disclosure will be described in detail with reference to the accompanying drawings.

Figure 1:
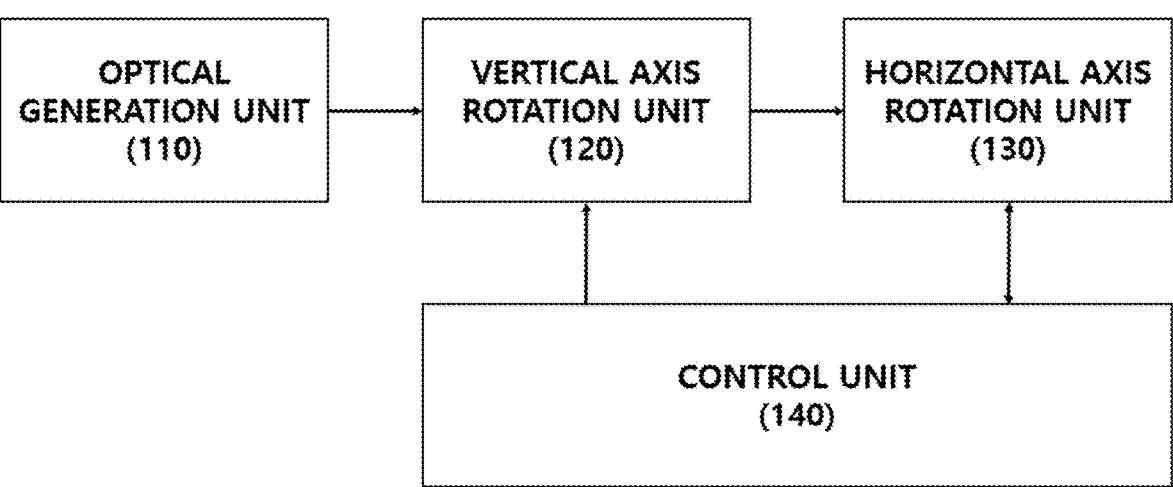
FIG. 1 is a block diagram of a transmission unit of a wireless optical charging system with an adjustable output direction according to an exemplary embodiment of the present disclosure.
Figure 2:
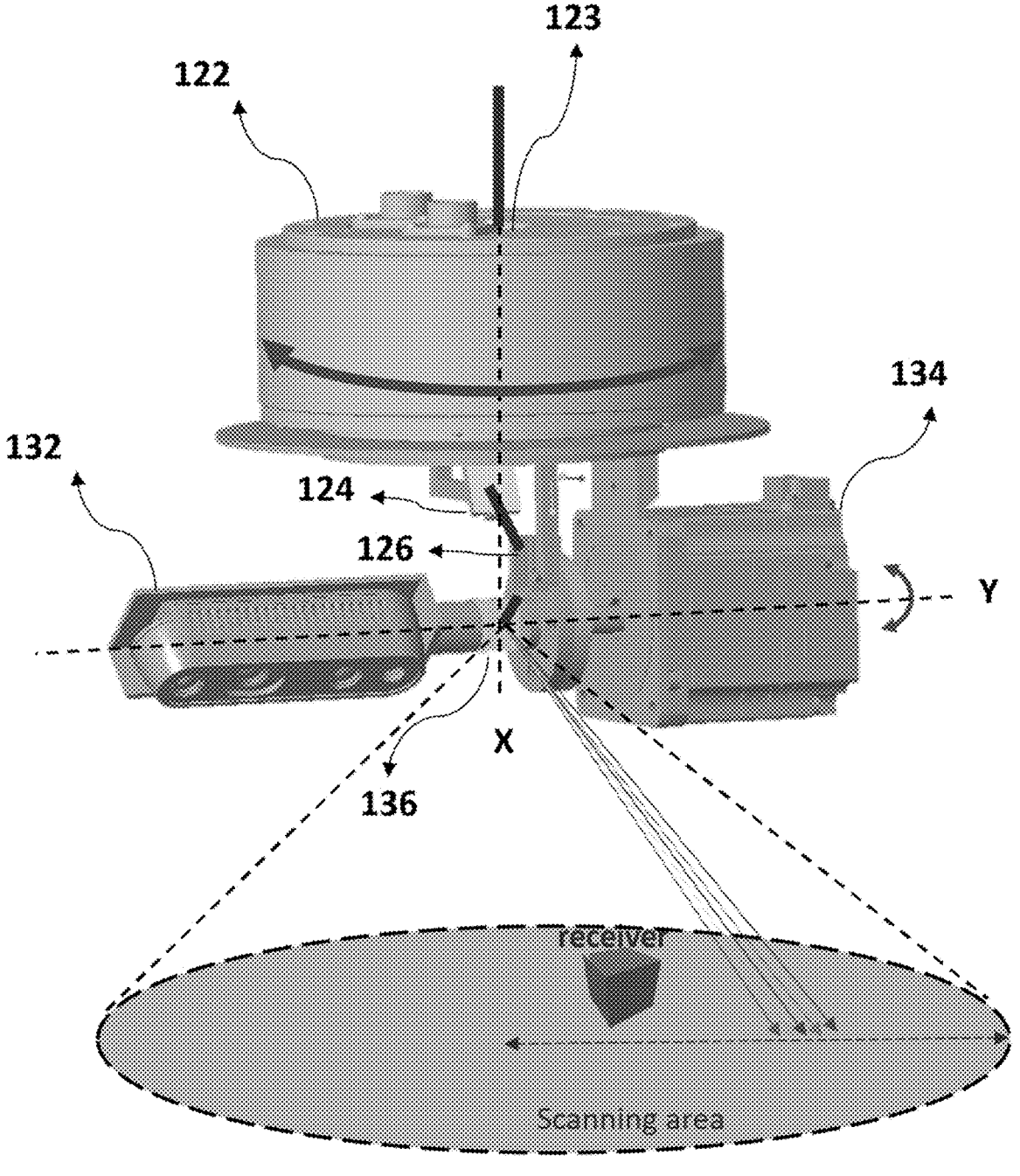
FIG. 2 is a diagram for describing a vertical axis rotation unit and a horizontal axis rotation unit of the transmission unit of a wireless optical charging system with an adjustable output direction according to an exemplary embodiment of the present disclosure.

FIG. 1 is a block diagram of a transmission unit of a wireless optical charging system with an adjustable output direction that is attached to a ceiling of an indoor space according to an exemplary embodiment of the present disclosure. FIG. 2 is a diagram for describing a vertical axis rotation unit and a horizontal axis rotation unit of the transmission unit of a wireless optical charging system with an adjustable output direction according to an exemplary embodiment of the present disclosure.

Referring to FIG. 1, the transmission unit 100 of a wireless optical charging system with an adjustable output direction according to an exemplary embodiment of the present disclosure includes an optical generation unit 110, a vertical axis rotation unit 120, a horizontal axis rotation unit 130, and a control unit 140.

The optical generation unit 110 generates laser light.

Here, the laser LASER is an abbreviation for light amplification by stimulated emission of radiation, and a monochromatic laser beam or laser light that is strong, does not spread, and is transmitted far is called a 'laser'. In addition, the laser light has characteristics of monochromaticity, linearity, coherence, high output, and polarization.

For example, the optical generation unit 110 may generate the laser light using a semiconductor laser or optical fiber laser method that uses a semiconductor or optical fiber as a gain medium. In this case, the optical generation unit 110 may allow the generated laser light to pass through a collimator and then input the generated laser light to the vertical axis rotation unit 120.

The vertical axis rotation unit 120 rotates along an axis X perpendicular to a floor of the indoor space and transmits the laser light.

That is, the vertical axis rotation unit 120 is equipped with a motor and may rotate along the axis X perpendicular to the floor of the indoor space. In addition, the vertical axis rotation unit 120 may transmit the laser light generated from the optical generation unit 110 to the vertical axis rotation unit 120.

In another exemplary embodiment, the vertical axis rotation unit 120 may rotate using a hollow shaft servo motor 122, and the laser light may be transmitted through a hollow 123 of the hollow shaft servo motor 122.

For example, referring to FIG. 2, the vertical axis rotation unit 120 includes a hollow shaft servo motor 122, and the hollow shaft servo motor 122 may rotate along an axis X perpendicular to a floor of the indoor space. In this case, as the hollow shaft servo motor 122 rotates, the horizontal axis rotation unit 130 attached to a lower portion of the vertical axis rotation unit 120 may rotate together. In addition, a hollow 123 is provided in a center portion of the hollow shaft servo motor 122, and the laser light may pass through the hollow 123.

The horizontal axis rotation unit 130 rotates while being attached to the vertical axis rotation unit 120, has a plurality of cameras 132 attached thereto, outputs the transmitted laser light, and rotates an output direction of the laser light and a direction of the plurality of cameras along an axis Y that is horizontal to the floor of the indoor space.

That is, the horizontal axis rotation unit 130 is fixedly attached to the vertical axis rotation unit 120, and thus, may rotate together as the hollow shaft servo motor 122 of the vertical axis rotation unit 120 rotates.

In addition, the plurality of cameras 132 are attached to the horizontal axis rotation unit 130, and the indoor space may be captured using the plurality of cameras 132. In addition, the horizontal axis rotation unit 130 may output the laser light transmitted from the vertical axis rotation unit 120 to the outside.

In this case, the output direction of the laser light and the direction of the plurality of cameras are the same, and as the horizontal axis rotation unit 130 rotates along the axis Y horizontal to the floor of the indoor space, the direction may rotate.

In another exemplary embodiment, the plurality of cameras 132 may include an infrared (IR) camera and a depth camera.

Here, the IR camera is a camera for capturing the indoor space, and is equipped with an IR LED, so the IR camera can capture objects to identify the objects even at night. In addition, the depth camera is a camera for acquiring distance information to an object located in the indoor space.

That is, the horizontal axis rotation unit 130 may acquire images of the indoor space using the IR camera and acquire the distance information to the object located in the indoor space using the depth camera.

As another exemplary embodiment, the horizontal axis rotation unit 130 may rotate the output direction of the laser light and the direction of the plurality of cameras within a predetermined range using a stepper motor 134.

That is, the horizontal axis rotation unit 130 rotates the stepped motor 134 to rotate the output direction of the laser light and the direction of the plurality of cameras along the axis Y horizontal to the floor of the indoor space within the predetermined range.

The control unit 140 controls the vertical axis rotation unit 120 and the horizontal axis rotation unit 130 according to rotation angles in the vertical and horizontal directions calculated using the images captured by the plurality of cameras.

In this case, the control unit 140 may include a computing device that includes a processor and a memory therein or may be connected to an external computing device. In addition, the control unit 140 may receive the rotation angles in the vertical and horizontal calculated by the computing device and control the vertical axis rotation unit 120 and the horizontal axis rotation unit 130.

To this end, the control unit 140 may control the plurality of cameras 132 to capture the indoor space and provide the captured results to the computing device to calculate the rotation angles in the vertical and horizontal directions.

In another exemplary embodiment, the laser light generated from the optical generation unit 110 may be reflected by a first mirror 124 attached to the vertical axis rotation unit 120, may pass through a diffraction grating 126 attached to the vertical axis rotation unit 120, and may then be reflected by a second mirror 136 attached to the horizontal axis rotation unit 130 and output to an outside.

For example, referring to FIG. 3, the laser light generated from the optical generation unit 110 may pass through the hollow 123 of the hollow shaft servo motor 122, may be reflected by the first mirror 124, may pass through the diffraction grating 126, and may then be reflected by the second mirror 136 and be output to the indoor space.

In another exemplary embodiment, the laser light generated from the optical generation unit 110 may pass through the diffraction grating attached to the vertical axis rotation unit 120, may be reflected by the first mirror attached to the vertical axis rotation unit 120, and may then be reflected by the second mirror attached to the vertical axis rotation unit 120 and output to an outside.

For example, the laser light generated from the optical generation unit 110 may pass through the hollow 123 of the hollow shaft servo motor 122, pass through the diffraction grating (not illustrated), may be reflected by the first mirror (not illustrated), and may then be reflected by the second mirror (not illustrated) and output to the indoor space.

In another exemplary embodiment, the control unit 140 may recognize the reception unit in the first image captured using the IR camera to generate a bounding box.

For example, the control unit 140 may recognize the reception unit in the first image using a deep learning model such as You Only Look Once (YOLO) and calculate the bounding box of the searched reception unit.

In addition, the control unit 140 may acquire the distance information, which is information on the distance to the reception unit, from the second image captured using the depth camera, and may calculate pixel distances in X-axis and Y-axis directions with respect to a center point of the first image and a center point of the bounding box in the first image.

In this case, the control unit 140 may acquire, from the second image, the distance information with respect to the position of the bounding box previously calculated in the first image. To this end, the control unit 140 may previously hold a table for matching the positions in the first image and the second image. The control unit 140 may use the table to know what specific coordinates in the first image are in the second image.

In addition, the control unit 140 may calculate the pixel distances in the X-axis and Y-axis directions with respect to the center point of the first image and the center point of the bounding box in the first image. For example, it may be assumed that the size of the first image is 200 pixels in width and 200 pixels in height. In this case, when an upper left coordinate of the first image is (0,0), the center point of the first image may be (100, 100), and when the center point of the bounding box is (150, 50), the pixel distance in the X-axis direction may be +50, and the pixel distance in the Y-axis direction may be −50.

Finally, the control unit 140 may calculate the rotation angles in the vertical and horizontal distances using the pixel distance, the focal length of the IR camera, and the distance information.

Here, the detailed process of calculating, by the control unit 140, the rotation angles in the vertical and horizontal directions will be described in detail later in the exemplary embodiment below.

Meanwhile, the rotation angle in the vertical direction may mean the rotation angle of the vertical axis rotation unit 120, and the rotation angle in the horizontal direction may mean the rotation angle of the horizontal axis rotation unit 130.

In another exemplary embodiment, when the control unit 140 calculates the rotation angles in the vertical and horizontal directions, the displacement of the reception unit may be calculated using the pixel distance, the focal length of the IR camera, and the distance information.

That is, referring to FIG. 4, the control unit 140 may calculate displacements h in the axial and Y-axis directions of the center point of the bounding box from the pixel distances in the X-axis and Y-axis directions, and then calculate a displacement H of the reception unit in the X-axis direction and Y-axis direction, respectively, using a focal length f and distance information d of the IR camera. In this case, the control unit 140 may use Equation 1 below.

$$H = \frac{h*d}{f}$$ [Equation 1]

Here, d denotes the distance from the transmission unit 100 to the reception unit, f denotes the focal length of the IR camera, h denotes the pixel distance in the X-axis or Y-axis direction, and H denotes the displacement of the reception unit in the X-axis or Y-axis direction.

In addition, the control unit 140 may calculate the rotation angles in the vertical and horizontal directions, respectively, using the displacement and distance information of the reception unit.

That is, the control unit 140 may calculate the rotation angles in the vertical and horizontal directions using the displacement H and the distance information d of the reception unit. To this end, the control unit 140 may use Equation 2 below.

$$\theta = \arctan\frac{H}{d}$$ [Equation 2]

Here, d denotes the distance from the transmission unit 100 to the reception unit, and H denotes the displacement of the reception unit in the X-axis or Y-axis direction.

For example, referring to FIG. 5, the control unit 140 may calculate the rotation angle of the vertical axis rotation unit 120 using $C_x$, which is the displacement of the reception unit in the X-axis direction, and d, which is the distance from the transmission unit 100 to the reception unit. In addition, the control unit 140 may calculate the rotation angle of the horizontal axis rotation unit 130 using $C_y$, which is the displacement in the Y-axis direction of the reception unit, and d, which is the distance from the transmission unit 100 to the reception unit.

The technical spirit of the present disclosure has been illustratively described hereinabove. It will be appreciated by those skilled in the art that various modifications and alterations may be made without departing from the essential characteristics of the present disclosure. Accordingly, exemplary embodiments disclosed in the present disclosure are not to limit the technical spirit of the present disclosure but are to describe the technical spirit of the present disclosure. The scope of the technical spirit of the present disclosure is not limited by these exemplary embodiments. The scope of the present disclosure should be interpreted by the following claims, and it should be interpreted that all the technical spirits equivalent to the following claims fall within the scope of the present disclosure.

The invention claimed is:

1. A transmission unit of a wireless optical charging system with an adjustable output direction attached to a ceiling of an indoor space, the transmission unit comprising:

an optical generation unit that generates laser light;

a vertical axis rotation unit that rotates along an axis perpendicular to a floor of the indoor space and transmits the laser light;

a horizontal axis rotation unit that rotates while attached to the vertical axis rotation unit, has a plurality of cameras attached thereto, outputs the transmitted laser light, and rotates an output direction of the laser light and a direction of the plurality of cameras along an axis horizontal to the floor of the indoor space; and a control unit that controls the vertical axis rotation unit and the horizontal axis rotation unit according to rotation angles in vertical and horizontal directions calculated using images captured by the plurality of cameras.

2. The transmission unit of claim 1, wherein the plurality of cameras include an IR camera and a depth camera.

3. The transmission unit of claim 1, wherein the laser light generated from the optical generation unit is reflected by a first mirror attached to the vertical axis rotation unit, passes through a diffraction grating attached to the vertical axis rotation unit, and is then reflected by a second mirror attached to the horizontal axis rotation unit and outputs to an outside.

4. The transmission unit of claim 1, wherein the laser light generated from the optical generation unit passes through the diffraction grating attached to the vertical axis rotation unit, is reflected by a first mirror attached to the vertical axis rotation unit, and is then again reflected by a second mirror attached to the vertical axis rotation unit and outputs to an outside.

5. The transmission unit of claim 1, wherein the vertical axis rotation unit rotates using a hollow shaft servo motor, and the laser light is transmitted through a hollow of the hollow shaft servo motor.

6. The transmission unit of claim 1, wherein the horizontal axis rotation unit rotates the output direction of the laser light and the direction of the plurality of cameras within a predetermined range using a stepper motor.

7. The transmission unit of claim 2, wherein the control unit recognizes a reception unit in a first image captured using the IR camera to generate a bounding box, acquires distance information, which is information on a distance to the reception unit, from a second image captured using the depth camera, calculates pixel distances in X-axis and Y-axis directions with respect to a center point of the first image and a center point of the bounding box in the first image, and calculates the rotation angles in the vertical and horizontal directions using the pixel distance, a focal length of the IR camera, and the distance information.

8. The transmission unit of claim 7, wherein when the control unit calculates the rotation angles in the vertical and horizontal directions, the control unit calculates a displacement of the reception unit using the pixel distance, the focal length of the IR camera, and the distance information, and calculates the rotation angles in the vertical and horizontal directions using the displacement and distance information, respectively.

* * * * *